(12) United States Patent
Wang et al.

(10) Patent No.: US 10,628,252 B2
(45) Date of Patent: Apr. 21, 2020

(54) REAL-TIME ANOMALY DETECTION AND CORRELATION OF TIME-SERIES DATA

(71) Applicant: Google LLC, Mountain View, CA (US)

(72) Inventors: Xiang Wang, Mountain View, CA (US); Tara Safavi, Ann Arbor, MI (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 15/816,483

(22) Filed: Nov. 17, 2017

(65) Prior Publication Data

US 2019/0155672 A1 May 23, 2019

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ............... G06F 11/079; G06F 11/0709; G06F 11/0751; G06F 11/0775; G06F 11/0769; G06F 11/0781; G06F 11/3006; G06F 11/3065; G06F 11/3072; G06F 11/3075; G06F 11/3082; G06F 11/3086; G06F 17/18; G06K 9/00536; G06K 9/6284
See application file for complete search history.

(56) References Cited

U.S. PATENT DOCUMENTS

| 7,363,656 B2 | 4/2008 | Weber et al. |
| 2009/0030753 A1* | 1/2009 | Senturk-Doganaksoy ................. G05B 23/0221 705/7.38 |

(Continued)

OTHER PUBLICATIONS

Cheboli, Deepthi. "Anomaly Detection of Time Series" Thesis, The University of Minnesota, May 2010.
Chandola, Varun, et al. "Anomaly Detection : A Survey" ACM Computing Surveys (CSUR), vol. 41, No. 3, p. 15, Jul. 1, 2009.
Newton, Benjamin D. "Anomaly Detection in Network Traffic Traces Using Latent Dirichlet Allocation", Comp 790-124 Machine Learning, Final Project, Dec. 2012.

(Continued)

*Primary Examiner* — Joseph D Manoskey
(74) *Attorney, Agent, or Firm* — Lerner, David, Littenberg, Krumholz & Mentlik, LLP

(57) ABSTRACT

Various aspects of the subject technology related to systems and methods for detecting and correlating anomalous time-series data. A system may be configured to receive and process time-series data associated with one or more network data streams to generate sets of aligned time-series data. The system may detect anomalous time-stamped data points in the sets of aligned time series data and generate groups of annotated time-series data. The annotation identifies specific time-stamped data points as anomalous. The system may determine the number of anomalous groups of annotated time-series data within all groups of annotated time-series data and may further determine the probability that one or more anomalous groups belong to at least one of the groups of annotated time-series data using a generative statistical model and outputting one or more correlated anomalous groups. The system may generate a details statistical report for each correlated anomalous group and output an aggregated statistical report for the correlated groups.

35 Claims, 8 Drawing Sheets

(51) Int. Cl.
*G06K 9/00* (2006.01)
*G06K 9/62* (2006.01)
*G06F 17/18* (2006.01)

(52) U.S. Cl.
CPC .......... *G06F 11/0775* (2013.01); *G06F 17/18* (2013.01); *G06K 9/00536* (2013.01); *G06K 9/6284* (2013.01)

(56) References Cited

U.S. PATENT DOCUMENTS

| | | | | |
|---|---|---|---|---|
| 2015/0339265 | A1* | 11/2015 | Thibaux | G06F 17/18 702/179 |
| 2016/0103724 | A1* | 4/2016 | Kim | G06F 11/0751 714/37 |
| 2016/0350173 | A1* | 12/2016 | Ahad | G06F 11/3495 |
| 2017/0031744 | A1* | 2/2017 | Iyer | G06F 11/0751 |
| 2017/0329660 | A1* | 11/2017 | Salunke | G06F 11/34 |
| 2018/0219759 | A1* | 8/2018 | Brown | H04L 67/26 |
| 2018/0329769 | A1* | 11/2018 | Sun | G06F 11/079 |

OTHER PUBLICATIONS

Laptev, Nikolay, et al. "Generic and Scalable Framework for Automated Time-series Anomaly Detection" In Proceedings of the 21th ACM SIGKDD International Conference on Knowledge Discovery and Data Mining, pp. 1939-1947, Aug. 10, 2015.

Wei, Xing, et al. "Dynamic Mixture Models for Multiple Time Series" In Ijcai, vol. 7, pp. 2909-2914, Jan. 6, 2007.

Wu, Qingtao, et al. "Network Anomaly Detection Using Time Series Analysis" In Joint International Conference on Autonomic and Autonomous Systems and International Conference on Networking and Services, ICAS-ICNS 2005, Oct. 23, 2005.

International Search Report and Written Opinion dated Apr. 5, 2019 in PCT Application No. PCT/US2018/052684.

Xiong, Liang, et al. "Hierarchical probabilistic models for group anomaly detection." In Proceedings of the Fourteenth International Conference on Artificial Intelligence and Statistics, pp. 789-797, Jun. 2011.

* cited by examiner

REAL-TIME ANOMALY DETECTION AND CORRELATION OF TIME-SERIES DATA

BACKGROUND

A time series is a series of data points indexed in time order. A wide variety of data can be represented as a time series, such as daily temperatures, closing values of financial markets, as well as data relating to network performance such as latency, packet loss or network outages. Time series data can include one or more data points that may be anomalous or otherwise outside the normally expected range of values that is commonly associated with the specific variable being represented in the time series. To better understand the nature of the anomalous time series data points, it is advantageous to detect and accurately classify the anomalous data from the expected, non-anomalous data present in the time series.

Network data can often be represented as a time series. For example, many network performance characteristics can be measured as a function of time such as packet or link latency or the amount of up-time or down-time exhibited by a particular network entity, such as a switch, or by a collection of network entities. Evaluating network time series data for anomaly detection and correlation can rapidly become a complex problem as the overall network size and the dynamic interconnectedness of participating network entities constantly changes. For example, as physical networks become larger with a greater number of interconnections, the likelihood of network outages or failure events may also rise. In many cases, the network failures may be correlated, for example certain sets of links may tend to fail simultaneously due to single points of failures within the network. Similarly, latencies between large groups of endpoints pairs could increase simultaneously due to the degradation of shared portions of their path(s). Evaluating streams of network data in real-time to identify network failure events would greatly benefit network efficiency and operation, however doing so can be difficult because the network data often includes noise, missing values, and/or inconsistent time granularity. In addition, real-time monitoring and evaluation involves processing extremely large amounts of network data, which can be difficult to scale as the size and complexity of modern network infrastructures grow.

SUMMARY

According to one aspect, the disclosure relates to a computer-implemented method for detecting and correlating anomalous time-series data. The method includes receiving a plurality of time-series data associated with one or more network data streams. The method also includes processing the received plurality of time-series data and generating one or more sets of aligned time-series data. The method includes detecting anomalous time-stamped data points in each of the one or more sets of aligned time-series data and generating one or more groups of annotated time-series data. The annotation identifies one or more specific time-stamped data points as anomalous. The method also includes determining the number of anomalous groups of annotated time-series data within all of the one or more groups of annotated time-series data. The method includes determining the probability that one or more anomalous groups of annotated time-series data belong to at least one of the groups of annotated time-series data using a generative statistical model and outputting one or more correlated anomalous groups. The one or more anomalous groups are determined to be correlated based on the anomalous groups including one or more statistically correlated anomalous time-stamped data points. The method also includes processing each of the one or more outputted correlated anomalous groups to generate a detailed statistical report for each correlated anomalous group. The method also includes outputting an aggregated statistical report for the one or more correlated anomalous groups.

In some implementations, the received time-series data includes one or more of binary data types, categorical data types, or real-valued data types. In some implementations, the one or more network data streams are received from external sources. In some implementations, processing the received plurality of time-series data includes one or more of normalizing the time-series data, inputting missing values, performing time-stamp up-sampling, performing time-stamp down-sampling, and removing noise from the received plurality of time-series data. In some implementations, the steps of processing the received plurality of time-series data are performed in parallel. In some implementations, the generated one or more sets of aligned time-series data are temporally aligned. In some implementations, detecting anomalous time-stamped data points in each of the one or more sets of aligned time-series data is performed using one or more virtual interfaces. The one or more virtual interfaces are determined based on the data type of the aligned time-series data. In some implementations, the one or more of virtual interfaces may detect anomalous time-stamped data points in parallel. In some implementations, determining the number of anomalous groups within all of the one or more annotated sets of time-series data is performed using a locality sensitive hashing algorithm. In some implementations, the generative statistical model is a Latent Dirichlet Allocation model. In some implementations, determining the probability that one or more anomalous group of annotated time-series data belong to at least one of the groups of annotated time-series data and outputting one or more correlated anomalous groups is performed in parallel. In some implementations, the one or more anomalous groups are determined to be not correlated based on the one or more anomalous groups not including one or more statistically correlated anomalous time-stamped data points. In some implementations, the detailed statistical report for each correlated anomalous group identifies the Pearson correlation coefficients, Jaccard similarities, and/or Bayes factors of each correlated anomalous group. In some implementations, the aggregated statistical report is output to users via one or more application programming interfaces. In some implementations, the aggregated statistical report is human-interpretable. In some implementations, the aggregated statistical report includes the probabilities of single network entity failures and grouped network entity failures.

According to certain aspects of the present disclosure, a system for detecting and correlating anomalous time-series data is provided. The system includes a memory storing computer-readable instructions and one or more generative statistical models. The system also includes a processor configured to execute the computer-readable instructions. The instructions, when executed cause the processor to receive a plurality of time-series data associated with one or more network data streams. The processors are further configured to process the received plurality of time-series data and generate one or more sets of aligned time-series data. The processors are further configured to detect anomalous time-stamped data points in each of the one or more sets of aligned time-series data and generate one or more groups of annotated time-series data. The annotation identifies one or more specific time-stamped data points as anomalous. The processors are further configured to determine the number of anomalous groups of annotated time-series data within all of the one or more groups of annotated time-series data. The processors are further configured to determine the probability that one or more anomalous groups of annotated time-series data belong to at least one of the groups of annotated time-series data using a generative statistical model and output one or more correlated anomalous groups. The one or more anomalous groups are determined to be correlated based on the anomalous groups including one or more statistically correlated anomalous time-stamped data points. The processors are further configured to process each of the one or more outputted correlated anomalous groups to generate a detailed statistical report for each correlated anomalous group. The processors are further configured to output an aggregated statistical report for the one or more correlated anomalous groups.

In some implementations, the processors are configured to receive time-series data including one or more of binary data types, categorical data types, or real-valued data types. In some implementations, the processors are configured to receive one or more network data streams from external sources. In some implementations, the processors are configured to process the received plurality of time-series data by one or more of normalizing the time-series data, inputting missing values, performing time-stamp up-sampling, performing time-stamp down-sampling, and removing noise from the received plurality of time-series data. In some implementations, the processors are configured to perform the steps of processing the received plurality of time-series data in parallel. In some implementations, the processors are configured to generate one or more sets of aligned time-series data that are temporally aligned. In some implementations, the processors are configured to perform detecting anomalous time-stamped data points in each of the one or more sets of aligned time-series data using one or more virtual interfaces. The one or more virtual interfaces are determined based on the data type of the aligned time-series data. In some implementations, the processors are configured with one or more virtual interfaces to detect anomalous time-stamped data points in parallel. In some implementations, the processors are configured to determine the number of anomalous groups within all of the one or more annotated sets of time-series data using a locality sensitive hashing algorithm. In some implementations, the generative statistical model is a Latent Dirichlet Allocation model. In some implementations, the processors are configured to determine the probability that one or more anomalous groups of annotated time-series data belong to at least one of the groups of annotated time-series data and output one or more correlated anomalous groups parallel. In some implementations, the processors are configured to determine that one or more anomalous groups are not correlated based on the one or more anomalous groups not including one or more statistically correlated anomalous time-stamped data points. In some implementations, the processors are configured to identify in the detailed statistical report for each correlated anomalous group the Pearson correlation coefficients, Jaccard similarities, and/or Bayes factors of each correlated anomalous group. In some implementations, the processors are configured to output the aggregated statistical report to users via one or more application programming interfaces. In some implementations, the aggregated statistical report is human-interpretable. In some implementations, aggregated statistical report includes the probabilities of single network entity failures and grouped network entity failures.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
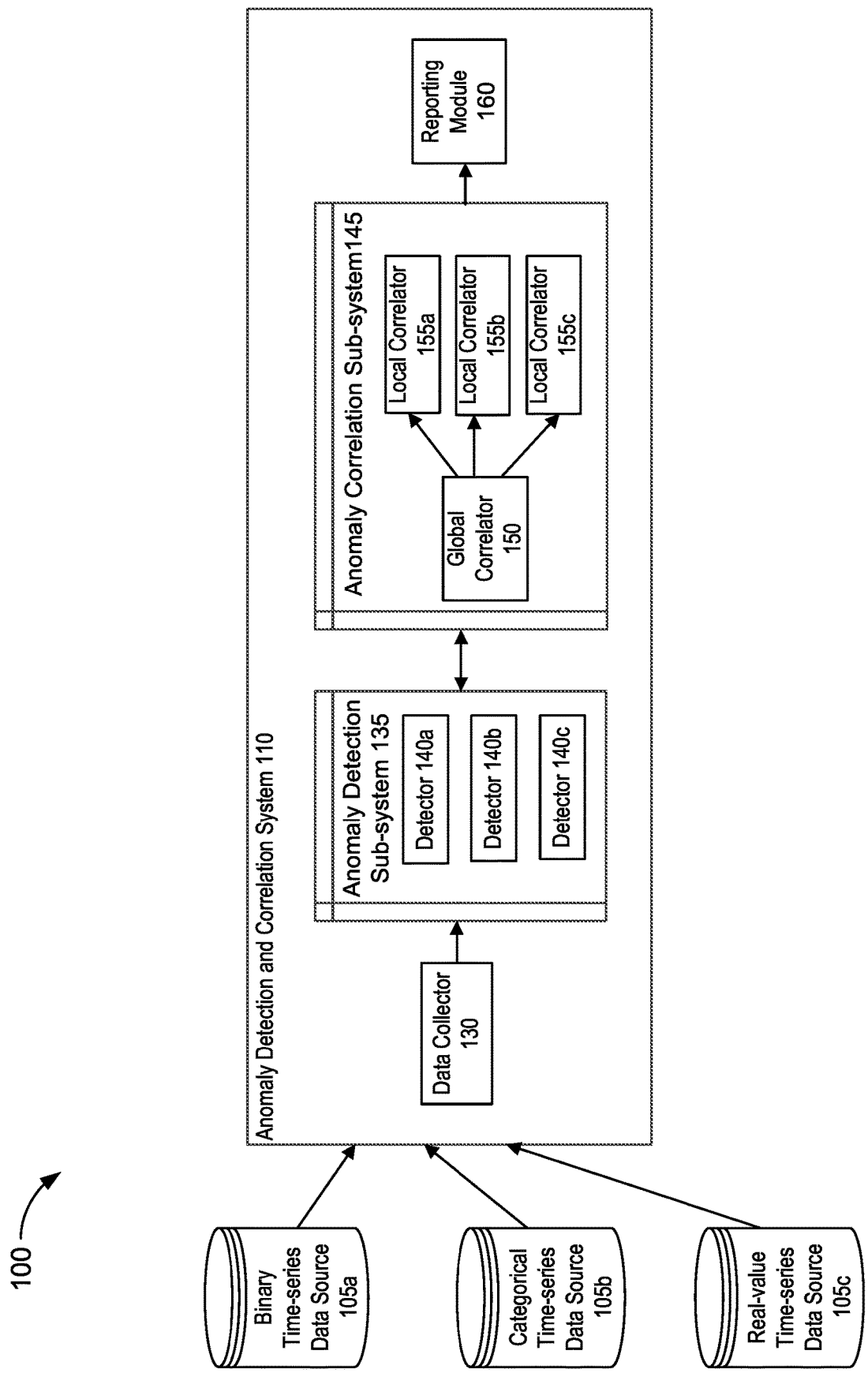
FIG. 1 illustrates an example functional block diagram of a system for detecting and correlating anomalous time-series data.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The disclosed system includes a number of components to collect and process network data streams. The system components can process the network data streams in real-time by performing the disclosed method of detecting and correlating anomalies from the collected network data streams. The system includes a data collection component to receive the network data streams from external data sources and perform data cleaning. For example, the data collection component may be a module to normalize data stream values, input missing values, perform timestamp up-sampling or down-sampling, as well as removing noise from the data stream values. The data collection component may perform the data cleaning steps in parallel. The data collection component outputs the cleaned data as set or groups of aligned time series data.

The aligned time series data can further be processed by an anomaly detection component. The anomaly detection component may include a plurality of virtual interfaces that are configured to perform anomaly detection based on the various data types that are present in the aligned time series data that are associated with the collected network data streams. For example, latency data received in histogram format may be converted to cumulative distribution function curves that are then normalized before calculating the difference in the area under the curve. In addition, the virtual interface may support processing network outage data as binary variables, as well as processing data which includes real-values, such as conditions where a data spike may indicate an anomaly. In some implementations, the anomaly detection component may perform the processing for various data types in parallel. The anomaly detection component may annotate specific time-stamped data points within the time-series data determined to be anomalous and may output groups or sets of annotated time series data.

The sets of annotated (anomalous) time series data are received by a global correlation component and processed by dividing the groups of annotated (anomalous) time series data into smaller groups to avoid cross-group correlation. The groups may then be further processed in parallel. A locality sensitive hashing function or algorithm is used to determine the number of anomalous groups within or across all of the sets of annotated time series data. The number of groups is then provided as an input to a generative statistical model, such as a Latent Dirichlet Allocation (LDA) model, to find the probability that one or more groups of annotated time series data belong to one of the groups of annotated time series data determined by the locality sensitive hashing function. The method steps performed by the global correlation component may also be performed in parallel. The output of the global correlation component is a grouping of the time series data such that the anomalies within a group are statistically correlated and the anomalies across groups are not statistically correlated. Using LDA, network entity groupings may be determined based on temporal failure patterns without requiring exhaustive pairwise time series data comparison.

Multiple local correlation components process the groups of anomalous time series data generated by the global correlation component in parallel and output statistics for a particular group of anomalous time series data. For example, one local correlation component may output statistical data for a particular group of anomalous time series data including, but not limited to, Pearson correlation coefficients, Jaccard similarities, and/or Bayes factors.

A reporting component aggregates the statistics generated by the local correlation components and presents the data as reports to users via various application programming interfaces (APIs). The reports and data included therein are human-interpretable and provide, for a given anomaly group, the probabilities of single and grouped network entity failures which can used for network planning and data-driven optimization of network resources.

The system and method disclosed herein addresses the problem of automatically detecting and correlating anomalous events from large amounts of time-series data in real-time or near real-time. Advances in computer processing, internet technologies, sensor architectures, and communication networking have created an unprecedented data ecosphere that is available for analysis using similarly advanced techniques in data science such as data mining, artificial intelligence, machine learning, classification and visualization. Gaining insight from such large volumes of data can be time-consuming, error prone, and is often limited by the configuration of specific tools or resources. One approach to help manage the task of evaluating such large volumes of data is to evaluate outliers or anomalous data points that are present in the volumes of data. While outliers tend to be ignored as minor, unexplainable inconsistencies associated with the data being collected, outliers can also shed important insight into the root cause of the anomalous data. This is especially true in network data, where anomalous time-series data may indicate the failure of a particular network device, network interface or connection between networks or network devices. As the complexity and size of modern sensor and communication networks increase, the interconnectedness of network elements also increases which means larger volumes of time-series data must be evaluated in order to accurately assess anomalous data points so that the root cause of the anomaly can be better understood. Traditional methods to detect and evaluate network time-series data anomalies, such as rule- or threshold-based alerting, dashboard inspection, or periodic spot checking of data, are not suitable given the enormous amounts of data being generated in modern networks and are also not robust to handle noisy, fluctuating anomaly data. In addition, traditionally network failure data has been represented as binary data values. For example, a binary value for a particular network failure may be associated with each network link. If the link is operational, the value would be "0", if the link has failed, the value would be "1", or vice versa. Using only binary values for anomaly detection limits the correlative inferencing such that latent factors, which are associated with network failure events, remain un-discovered and hidden providing reduced insight into the root cause of a particular network failure. As will be discussed in more detail below, using real-valued data streams, such as latency or packet loss, instead of solely binary data can improve the ability to robustly correlate latent or hidden factors (or network entities) that are likely to behave anomalously.

Solutions to these problems may be achieved by the disclosed systems and methods whereby network data streams, and corresponding time-series data within the network data streams, may be monitored and evaluated in an automated, near real-time manner to detect anomalous network failure events in order to condense or correlate the failure events into groups of outliers so that the root causes of the failures can be determined. This solution can also help improve network planning by identifying critical failure modes and modeling the failure modes accurately such that future occurrences can be more easily associated with a previously determined root cause. In addition, the disclosed systems and methods enable anomaly detection and correlation to be performed in a way that may afford greater scalability and parallelization compared to traditional techniques because the components of the system may be configured in a distributed architecture as will be described in relation to FIG. 2. The distributed architecture enables greater parallel processing of the large volumes of network failure data that may be generated by larger, more complex networks. The system and method may also provide more robust processing of noisy, uncorrelated anomaly data by removing or ignoring small individual fluctuations in the data that may distort anomaly correlation. In addition, the system and method are not limited to detecting and correlating network failure anomalies based solely on binary failure data. The system and method function to process real-valued network failure data types in order to more robustly detect and correlate anomalies that may be associated with latent or hidden factors (or network entities).

FIG. 1 illustrates an example functional block diagram of a system 100 for detecting and correlating anomalous time-series data. The system 100 includes a plurality of time-series data sources, shown as binary time-series data source 105a, categorical time-series data source 105b, and real-value time-series data source 105c. The plurality of time-series data sources will each generally be referred to as a time-series data source 105 or collectively as time-series data sources 105. The system 100 also includes an anomaly detection and correlation system 110. The anomaly detection and correlation system 110 includes a data collector 130 and an anomaly detection sub-system 135. The anomaly detection sub-system 135 includes a plurality of detectors 140, such as detector 140a, 140b, and 140c. The plurality of detectors 140 will each generally be referred to as detector 140 or collectively as detectors 140. The anomaly detection and correlation system 110 also includes an anomaly correlation sub-system 145. The anomaly correlation sub-system 145 includes a global correlator 150 and a plurality of local correlators 155, such as local correlators 155a, 155b, and 155c. The plurality of local correlators will each generally be referred to as local correlator 155 or collectively as local correlators 155. The anomaly detection and correlation system 110 also includes a reporting module 160.

As shown in FIG. 1, the system 100 includes a plurality of time-series data sources 105 that store network time-series data. The time-series data sources 105 are sources of time-series data. The time-series data stored in the time-series data sources 105 is received by the data collector 130 of the anomaly detection and correlation system 110. The time-series data sources 105 may store time-series data that may be associated with one or more aspects of a network's performance over a period of time, such as latency values, link status (e.g., the link is functional or non-functional), and/or network entity ownership.

The time-series data stored in the data sources 105 may include a variety of time-series data types. For example, as shown in FIG. 1, the binary time-series data source 105a may store binary time-series data. Binary time-series data may include data, measured as a function of time, that represents one of only two possible values. In this example, binary time-series data source 105a may store binary time-series data such as link connectivity status as measured over time, where the time-series value of the link connectivity status may be only one of two values (e.g., functional (1) or non-functional (0)) or vice versa. As further shown in FIG. 1, the time-series data sources 105 may also include a categorical time-series data source 105b. The categorical time-series data source 105b may store categorical time-series data types. Categorical time-series data types may include data, measured as a function of time, which represents one of multiple possible values (or categories). For example, a categorical time-series data source 105b may store categorical time-series data such as the network operator associated with a particular network entity, such as a switch or router that is deployed in a network. In this example, the categorical time-series data may represent the name of the network operator associated with a specific network entity. The network operator may be a single operator identified from multiple possible operators. As further shown in FIG. 1, the time-series data sources 105 may also include a real-value time-series data source 105c. The real-value time-series data source 105c may store real-value time-series data. Real-value time-series data may include data, measured as a function of time, which represents numerical or real-value data. For example, a real-value data-source 105c may store real-value time-series data such as latency values that are associated with a particular link or network device in a packet-switched network, measured in milliseconds. In this example, the real-value time-series data may include a specific numerical value that has been measured as a function of time.

In some implementations, the time-series data sources 105 may store time-series data that is associated with one or more network data streams. The network data streams may be received from external sources. For example, the network data streams may be associated with networks that are located remotely from the time-series data sources 105 or the anomaly detection and correlation system 110.

As further shown in FIG. 1, the system 100 includes an anomaly detection and correlation system 110. The anomaly detection and correlation system 110 includes multiple components that are configured to detect and correlate anomalies in time-series data that is associated with one or more network data streams and received from the time-series data sources 105.

As shown in FIG. 1, the anomaly detection and correlation system 110 includes a data collector 130. The data collector 130 receives the time-series data from the time-series data sources 105 and prepares the data for anomaly detection and correlation processing. In broad terms, the data collector 130 applies a variety of data cleaning methods on the received time-series data in order to prepare the data for efficient detection and correlation processing. For example, the data collector may perform methods on the received time-series data including, but not limited to, normalization, missing value imputation, timestamp up- or down-sampling, as well as noise removal. In addition, the data collector 130 aligns the time-series data temporally and generates one or more sets of temporally aligned time-series data. In some implementations, the data collector 130 may fetch the time-series data from the time-series data sources 105 to perform the data cleaning methods. Additional details of the data cleaning methods that are performed by the data collector 130 will be described in more detail in relation to FIG. 4.

As further shown in FIG. 1, the anomaly detection and correlation system 110 includes an anomaly detection sub-system 135. The anomaly detection sub-system 135 receives the temporally aligned time-series data that was generated by the data collector 130 and performs anomaly detection on the aligned time-series data. The anomaly detection sub-system 135 includes a plurality of detectors such as detectors 140. The detectors 140 may be virtual interfaces for anomaly detection whose implementation corresponds to a particular time-series data type. The detectors 140 apply different anomaly detection techniques based on the time-series data type of the aligned time-series data received from the data collector 130 and annotate the anomalous time-stamped data points that were detected. The anomaly detection sub-system 135 generates groups of annotated (anomalous) time-series data for output. Additional details of the anomaly detection methods that are performed by the anomaly detection sub-system 135 will be described below in more detail in relation to FIG. 5.

As shown in FIG. 1, the anomaly detection and correlation server 110 includes an anomaly correlation sub-system 145. The anomaly correlation module 145 receives as input the groups of annotated time-series data and performs correlation techniques on the data to output a grouping of time-series data such that the anomalies within each group are statistically correlated to each other and the anomalies across different groups are not correlated or are substantially less correlated to each other. The anomaly correlation sub-system 145 includes a global correlator 150. The global correlator 150 divides the inputted groups of annotated time-series data into smaller groups so there is little or no cross-correlation between groups. The global correlator 150 performs correlation on the groups using a combination of hashing techniques to determine the number of anomalous groups or number of potentially anomalous groups across all inputted groups of annotated time-series data and subsequently provides the groups as inputs to a generative statistical model, such as a Latent Dirichlet Allocation model in order to determine the probability of each time-series belonging to only one group of the inputted groups of annotated time-series data. The output of the generative statistical model is a distribution of network entities that are associated with groups of correlated anomalous time-series data. In this way, heavier-weighted network entities, e.g., those with higher correlative probabilities, are most likely to fail simultaneously over the time period associated with the timestamped data of the inputted groups of annotated time-series data. In this way groups of network entities can be discovered as the root causes of anomalous time-series data based on the temporal failure patterns of the time-series data without requiring exhaustive pairwise comparisons of the time-series data.

As further shown in FIG. 1, the anomaly correlation sub-system 145 includes a plurality of local correlators, such as local correlators 155a-155c. The plurality of local collectors will be generally referred to as local correlators 155. The local correlators 155 each receive a respective group of correlated anomalous time-series data output by the global correlator 150. The local correlators 155 may perform additional statistical processing on each of the groups of correlated anomalous time-series data. The statistical processing performed by the local correlators 155 on the groups of correlated anomalous time-series data and the detected anomalies therein may include, but are not limited to, determining the Pearson correlation coefficient, the Jaccard similarities, and/or the Bayes factors. The local correlators 155 may output a detailed statistical report for each group of correlated anomalous time-series data which includes the results of the statistical processing performed by the local correlators 155. Additional details of the global correlator 150 and the local correlator's 155 functionality will be described below in relation to FIGS. 6 and 7, respectively.

In some implementations, a feedback loop may exist between the anomaly correlation sub-system 145 and the anomaly detection sub-system 135 as shown in FIG. 1 with the bi-directional arrow connecting the two sub-systems. In this way, the detectors 140 may be trained using the correlation results generated by the global correlator 150. This feedback loop may enable the detectors 140 to detect anomalies with greater accuracy.

As shown in FIG. 1, the anomaly detection and correlation system includes a reporting module, such are reporting module 160. The reporting module 160 may aggregate the detailed statistical reports that were output from the local correlators 155 and may generate an aggregated statistical report for the groups of correlated anomalous time-series data. The aggregated statistical reports may be made available to users through one or more application programming interfaces (APIs). Additional details of the reporting module 160 functionality will be described below in relation to FIG. 7.

The system 100 shown in FIG. 1 includes an anomaly detection and correlation system 110 including a plurality of components (or modules) and subsystems. Each sub-system may further include one or more components (or modules). As shown in FIG. 1, the plurality of components (or modules) and subsystems in the anomaly detection and correlation system 110 are configured on a single server and may operate in parallel on the single server. As will be shown in FIG. 2, the plurality of components (or modules) and subsystems in the anomaly detection and correlation system 110 may also be configured in an arrangement including distributed servers in order to increase the parallel processing of time-series data for anomaly detection and correlation.

Figure 2:
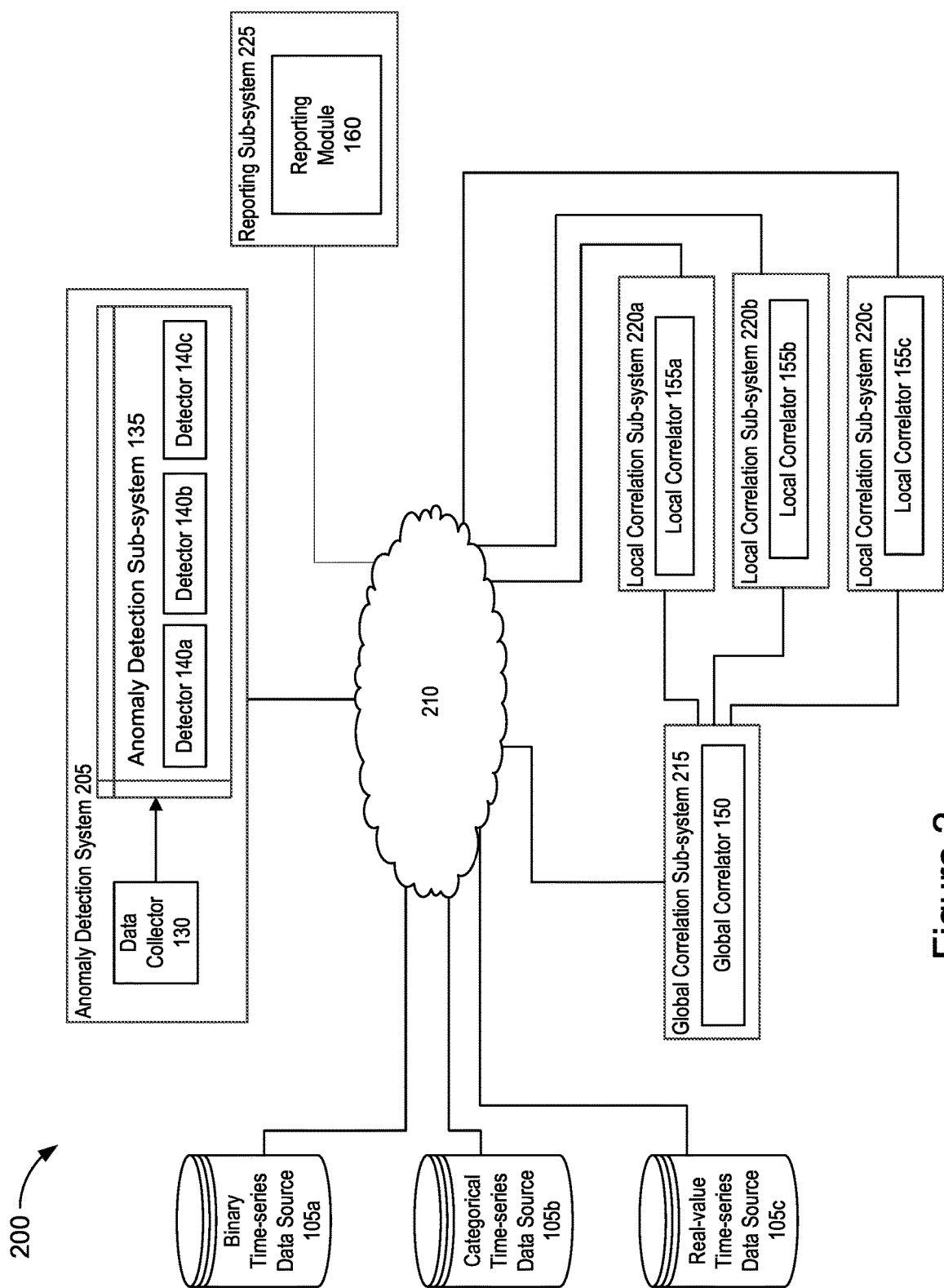
FIG. 2 illustrates an example architecture for detecting and correlating anomalous time-series data in a distributed server architecture.

FIG. 2 illustrates an example distributed server architecture for detecting and correlating anomalous time-series data. The architecture 200 includes identical components as described in relation to FIG. 1, however, the plurality of components and subsystems shown in FIG. 2 are arranged in a configuration of distributed servers that are connected via a network, instead of arranged within a single server as shown in FIG. 1. The functionality of the individual components and sub-systems shown in FIG. 2 is identical to the functionality of the individual components and sub-systems shown in FIG. 1.

The architecture 200 shown in FIG. 2 includes time-series data sources 105, an anomaly detection system 205, a network 210, a global correlation sub-system 215, and a plurality of local correlation sub-systems 220a-220c. The plurality of local correlation sub-systems 220a-c will be collectively referred to as local correlation sub-systems 220. The architecture 200 also includes a reporting sub-system 225.

As shown in FIG. 2, a plurality of time-series data sources, such as time-series data sources 105 described in relation to FIG. 1, are communicatively coupled to a network, such as the network 210. The time-series data sources 105 store time-series data of different data types that may be processed for anomaly detection and correlation. The stored time-series data may be transmitted over a network and received by the anomaly detection system 205. The anomaly detection system 205 includes a data collector, such as the data collector 130 described in relation to FIG. 1, and an anomaly detection sub-system, such as the anomaly detection sub-system 135 described in relation to FIG. 1. The anomaly detection sub-system 135 includes a plurality of detectors 140a-140c, which will each generally be referred to as detector 140 or collectively as detectors 140. The anomaly detection system 205 receives time-series data from the time-series data sources 205 over network 210 for processing by the data collector 130 and subsequently by the detectors 140 that are configured in the anomaly detection sub-system 135.

As further shown in FIG. 2, the architecture 200 includes a network 210. The network 210 can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like. The network 210 enables the communication of data to be processed by the distributed servers configured to detect and correlate anomalous time-series data.

As shown in FIG. 2, the architecture 200 includes a global correlation sub-system 215. The global correlation sub-system 215 includes a global correlator, such as the global correlator 150 described in relation to FIG. 1. The global correlation sub-system 215 receives annotated time-series data over the network 210 from the anomaly detection system 205.

As further shown in FIG. 2, the architecture 200 includes a plurality of local correlation sub-systems 220a-220c. The plurality of local correlation sub-systems will each generally be referred to as local correlation sub-system 220 or collectively referred to as local correlation sub-systems 220. Each respective local correlation subsystem 220 includes a local correlator 155a-155c, such as local correlator 155a-c described in relation to FIG. 1. The plurality of local correlators will each generally be referred to as local correlator 155 or collectively referred to as local correlators 155. The local correlation sub-systems 220 receive correlated anomalous groups of time-series data over the network 210 from the respective global correlation sub-system 215. The local correlators 155 process the correlated anomalous groups of time-series data to generate detailed statistical data and a detailed statistical report that is associated with each group of correlated anomalous data. The local correlation sub-systems 220 may transmit the detailed statistical reports over the network 210 for processing by the reporting sub-system 225. The reporting sub-system 225 includes a reporting module, such as reporting module 160 described in relation to FIG. 1.

As shown in FIG. 2, the anomaly detection system 205, the global correlation sub-system 215, the local correlation sub-systems 225, and the reporting sub-system 225 are configured on individual servers in a distributed server architecture 200. In some implementations, each system and/or sub-system may be configured on a separate server. In some implementations, individual systems and/or sub-systems may be combined on one or more servers. In some implementations, the individual systems and/or sub-systems may be implemented individually or combined on one or more virtual machines. In some implementations, the individual systems and/or sub-systems may be implemented individually or combined in one or more containerized environments. The individual systems and/or sub-systems may be implemented in such a distributed architecture 200 to enable greater parallelization of the anomaly detection and correlation processing that is performed by the components, systems, and/or sub-systems. In this way, the architecture 200 may enable greater scalability and increased processing capabilities than may be achieved in a non-distributed architecture. The distributed arrangement of the components, systems, and/or sub-systems as shown in FIG. 2 may also allow the detection and correlation processing of anomalous time-series data to occur at or near real-time execution speeds.

Figure 3:
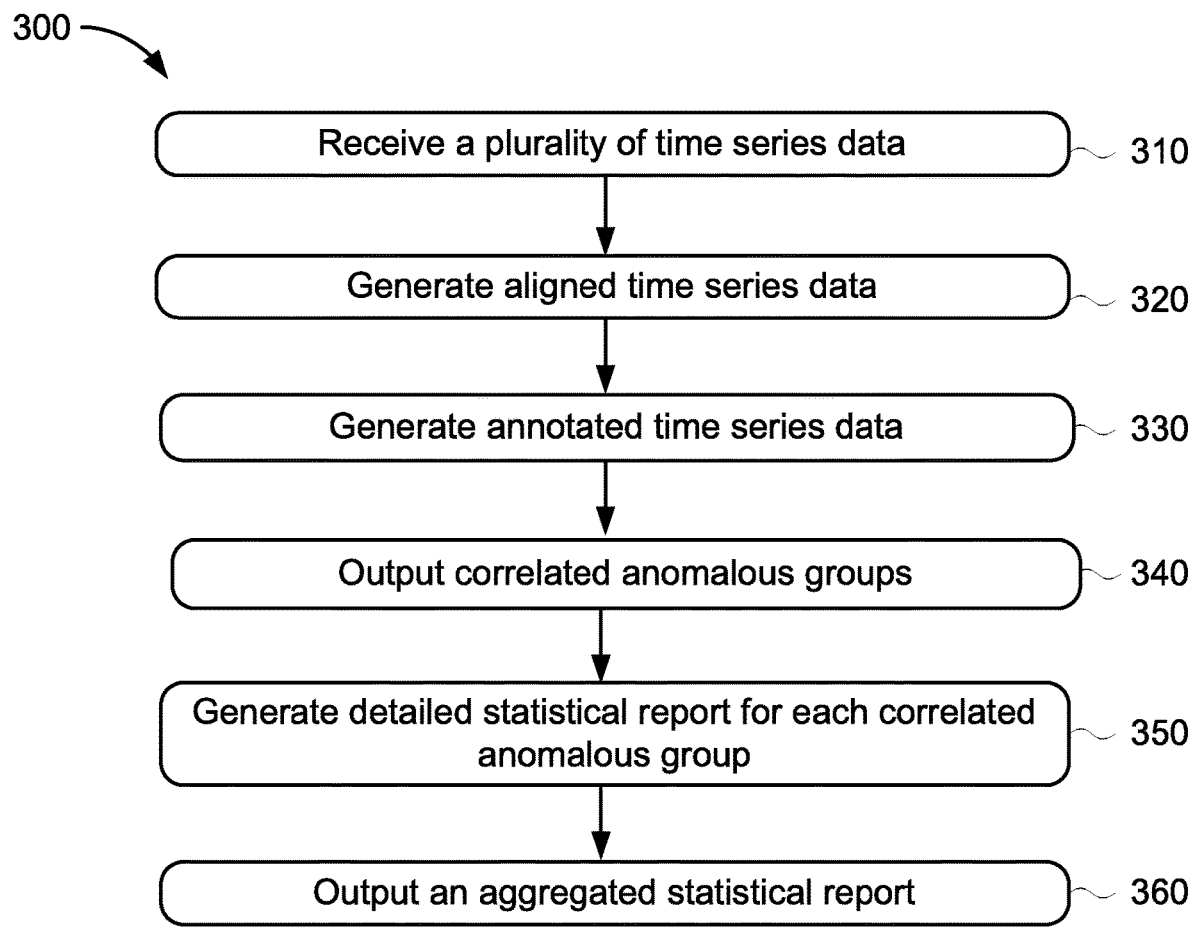
FIG. 3 is a flowchart showing an example method for detecting and correlating anomalous time-series data.

FIG. 3 illustrates an example method 300 for detecting and correlating anomalous time-series data performed by the components of the anomaly detection and correlation system 110 shown in FIG. 1. The method 300 includes receiving a plurality of time-series data (stage 310). The method further includes generating aligned time-series data (stage 320) and generating annotated time-series data (stage 330). The method includes outputting correlated anomalous groups of time-series data (stage 340) and generating a detailed statistical report for each correlated anomalous group (stage 350). The method further includes outputting an aggregated statistical report (stage 360).

At stage 310, the method 300 begins by the data collector 130 receiving a plurality of time-series data, such as the time-series data that is stored in the time-series data sources 105 shown in FIG. 1. The plurality of received time-series data may include a plurality of time-series data types, such as binary time-series data, categorical time-series data, and/or real-valued time-series data. The time-series data may be associated with one or more network data streams that may be received from one or more external sources. The data collector 130 may process the received time-series data and may condition or clean the data for subsequent processing by the anomaly detection sub-system 135.

At stage 320, the data collector 130 temporally aligns the time-series data and generates one or more sets of aligned time-series data. The method steps and processing details performed by the data collector 130 on the time-series data received from the plurality of time-series data sources 105 will be described below in relation to FIG. 4.

At stage 330, the detectors 140 of the anomaly detection sub-system 135 generate annotated time-series data. The anomaly detection sub-system 135 receives the sets of aligned time series data generated by the data collector 130 in stage 320 and the plurality of detectors 140 process the received time-series data to detect anomalous time-stamped data points that may be present in each of the one or more sets of aligned time-series data. The detectors 140 perform per-time-series anomaly detection to filter out irrelevant data. The detectors 140 may annotate anomalous time-stamped data points that are detected in the sets of aligned time-series data and may generate one or more groups of annotated time-series data. Each annotated group of time-series data may include one or more individually annotated anomalous time-stamped data points that were found to be present in the plurality of time-stamped data points included in each set of aligned time-stamped data. The method steps and processing details performed by the anomaly detection sub-system 135 on the sets of aligned time-series data received from the data collector 130 will be described below in relation to FIG. 5.

At stage 340, the anomaly correlation sub-system 145 outputs correlated anomalous groups. The sets of annotated time-series data generated by the detectors 140 of the anomaly detection sub-system 135 are received by the anomaly correlation sub-system 145 where the global correlator 150 may process the sets of annotated time-series data to determine the statistical correlation of the annotated time-stamped data identified in stage 330. The global correlator 150 may divide the sets of annotated time-series data into smaller groups so that there is no or only limited cross-group correlation across the groups. In this way, the global correlator 150 may determine a number of correlated anomalous groups of annotated time-series data within all of the one or more groups of annotated time-series data received from the detectors 140. The global correlator 150 may output the correlated anomalous groups. The method steps and processing details performed by the anomaly correlation sub-system 135 and its components therein on the sets of annotated time-series data received from the anomaly detection sub-system 135 will be described below in relation to FIG. 6.

At stage 350, the local correlators 155 of the of the anomaly correlation sub-system 145 generate detailed statistical reports for each of the correlated anomalous groups. The local correlators 155 receive the correlated anomalous groups output by the global correlator 150 in stage 340 and process the received time-series data to generate specific statistics for each group of correlated anomalous time-series data. The statistical methods applied to each group may include but are not limited to determining the Pearson correlation coefficient, the Jaccard similarity coefficient, and/or the Bayes factors. The local correlators 155 may include the results of the applied statistical methods in a detailed statistical report that is associated with the correlated anomalous groups and the anomalies identified therein. The local correlators 155 may generate the detailed statistical report for subsequent processing. The method steps and processing details performed by the local correlators 155 on the correlated anomalous groups of time-series data received from the global correlator 150 will be described below in relation to FIG. 7.

At stage 360, the reporting module 160 outputs an aggregated statistical report. The reporting module 160 receives the detailed statistical reports generated by the local correlators 155 in stage 350 and aggregates the detailed statistical report data for each correlated anomalous group into an aggregated statistical report. The aggregated statistical report may be formatted such that the report is human-interpretable or readily interpreted by a human. The aggregated statistical report may include probability data, such as the probability that a single network entity is associated with a network failure. The reporting module 160 may output the aggregated statistical report. In some implementations, the aggregated statistical report may be output to users via one or more application programming interfaces (APIs). The method steps and processing details performed by the reporting module 160 on the detailed statistical reports received from the local correlator 155 will be described below in relation to FIG. 7.

Figure 4:
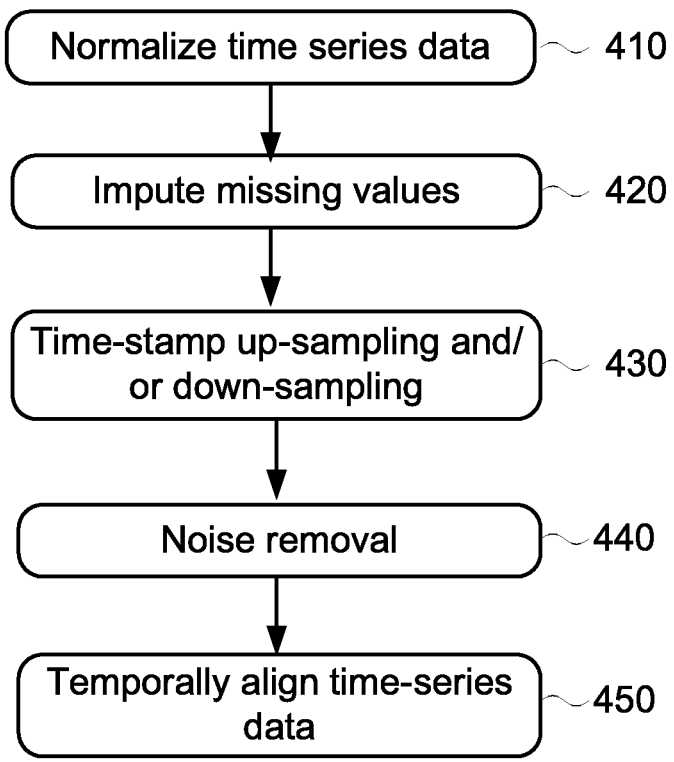
FIG. 4 is a flowchart showing an example method for generating aligned time-series data.

FIG. 4 illustrates an example method 400 for generating aligned time-series data performed by the data collector 130 shown in FIG. 1. The method 400 describes the method steps associated with generating aligned time-series data which was described earlier in relation to stage 320 of FIG. 3. The method 400 includes normalizing time-series data (stage 410) and imputing missing values (stage 420). The method also includes time-stamp up-sampling or time-stamp down-sampling (stage 430) and noise removal (stage 440). The method includes temporally aligning time-series data (stage 450).

At stage 410, the method 400 begins by the data collector 130 normalizing the time-series data that was received from the plurality of time-series data sources 105. The data collector 130 may clean or condition the received data for later processing to ensure more accurate most accurate anomaly detection and correlation. As the data can be associated with one or more network data streams that may be received from a variety of external sources, the data may be of an undetermined quality. The data collector 130 may perform the following method steps to enhance the quality of data so that subsequent anomaly detection and correlation can be performed in the most robust manner possible. For example, in stage 410 the data collector 130 may normalize the received time-series data. Normalizing the time-series data rescales the data from its original range of values so that all values are within the range of 0 and 1.

At stage 420, the data collector 130 imputes missing values. The data collector 130 may process the received time-series data and determine that one or more values are missing. Missing data can have adverse effects on the anomaly detection because the detectors 140 may falsely identify a missing value as an anomalous data point. The result of this false identification may be an over-estimation of the number of anomalous data points present with the received time-series data. The data collector 130 may include logic, algorithms or other ways of processing the received time-series data in order to identify and input missing values as appropriate based on the data type associated with the received time-series data.

At stage 430, the data collector 130 performs time-stamp up-sampling and/or time-stamp down-sampling. In up-sampling, the frequency of the time-series data is increased. In down-sampling, the frequency of the time-series data is decreased. For example, the received time-series data may have been collected on an hourly basis. Up-sampling the hourly time-series data to a basis of every 15 minutes would generate a new set of time-series data with extended values corresponding to the new time basis (e.g., every 15 minutes). Time-stamp up-sampling may produce missing values that must be filled by interpolation or by inputting missing values as described in stage 420. Time-stamp down-sampling may require careful selection of the statistical methods used to calculate new aggregated time-series data points, when, for example, the basis of the time-series data is changed from microseconds to seconds.

At stage 440, the data collector 130 performs noise removal. The data collector 130 may process the received time-series data to remove noise from the data using a variety of mathematical methods and/or algorithms. The method selected may depend on the data type of the time-series data, as well as the level of dimensionality of the time-series data. For example, noise may be removed in the received time-series data using median, mean, or trimmed mean absolute deviations. In some implementations, the noise removal may be performed using deconvolution techniques such as Weiner filtering, blind convolution techniques, exponential smoothing, outlier removal or substitution, as well as independent component analysis techniques.

At stage 450, the data collector temporally aligns time-series data. The data collector 130 may process the received time-series data to align the data temporally or in the context of time. When processing large volumes of time-series data, it is important to recognize that the data may include variability affecting the time scale on which the data was measured. For example, the time axes may have been shifted, compressed, or even expanded in complex, non-linear ways. In some cases, the scale of the measured time-series data can be inconsistent between sets of the same data. As a result, it is prudent to temporally align the time-series data. The data collector 130 may apply logic or algorithms such as the dynamic time warping algorithm used to measure similarity between two temporal sequences in order to align the time-series data in a temporal manner. The data collector 130 outputs one or more sets of temporally aligned time-series data to the anomaly detection sub-system 135.

Figure 5:
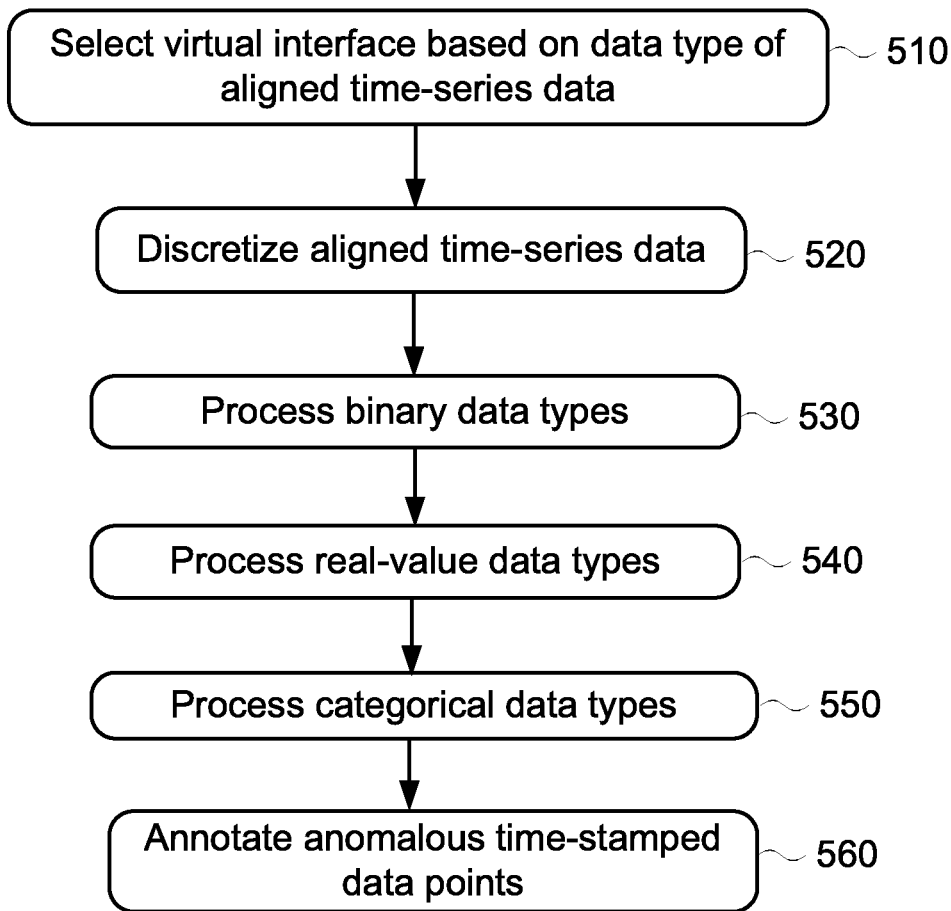
FIG. 5 is a flowchart showing an example method for generating annotated time-series data.

FIG. 5 illustrates an example method 500 for generating annotated time-series data performed by the detectors 140 that may be configured within the anomaly detection sub-system 135 shown in FIG. 1. The method 500 describes the method steps associated with generating aligned time-series data which was described earlier in relation to stage 330 of FIG. 3. The method 500 includes selecting a virtual interface based on the data type of the aligned time-series data (stage 510). The method also includes discretizing the aligned time-series data (stage 520). The method includes processing binary data types (stage 530), processing real-value data types (stage 540), and processing categorical data types (stage 550). The method also includes annotating anomalous time-stamped data points (stage 560).

At stage 510, the method 500 begins by the anomaly detection sub-system 135 receiving the sets of aligned time-series data generated by the data collector 130. The anomaly detection sub-system 135 may include a plurality of detectors 140. Each detector 140, such as detectors 140*a*-140*c* shown in FIG. 1, may implement a different virtual interface for performing anomaly detection. The different implementations may be based on or correspond to the data types of the time-series data that was received from the time-series data sources 105. For example, detector 140*a* may be configured to detect anomalies within binary time-series data, such as time-series data that is received from the binary time-series data source 105*b*. As time-series data is received from the data collector 130, the anomaly detection sub-system 135 may select the appropriate virtual interface that is configured on a particular detector 140 and upon selection, forward the aligned time-series data to the selected detector 140 for anomaly detection. Each detector 140 may implement different processing techniques that correspond to the data type of the received time-series data.

At stage 520, the anomaly detection sub-system 135 discretizes the aligned time-series data. The anomaly detection sub-system 135 may discretize the aligned time-series data in order to convert the aligned time-series data into a smaller number of finite values. Discretization typically involves the process of transferring continuous functions, models, equations, and/or data (e.g., time-series data) into discrete counterparts. Discretization further enables the data to be more suitable for numerical evaluation and implementation on computing devices. As used in the method performed by the anomaly detection sub-system 135, discretizing the aligned time-series data has the effect of emulating network failure data more accurately. For example, as a result of discretization, the original time-series data becomes sparse, consisting mostly of zeroes and the occasional non-zero integer value which may correspond to an anomaly. A variety of discretization pre-processing steps may be used.

At stage 530, one of the detectors 140 processes binary data types. Binary data types may include types of data for which the data values may only represent a "0" or a "1" for more than a certain number of samples. Upon determining the data type of the data included in the set of annotated time-series data received from the data collector 130, the anomaly detection sub-system 135 identifies the appropriate detector 140 that is configured to process the received time-series data type and detect anomalies. For example, detector 140*a* may be configured to process binary time-series data types and detect anomalies. The detector 140*a* may detect and identify binary time-series data values as an anomaly if the data value is "1". If the data value is "0", the detector 140*a* may identify the binary time-series data value as not anomalous. Upon detecting anomalous data values in the binary time-series data, the detector 140*a* may annotate the binary time-stamped data values as anomalous.

At stage 540, one of the detectors 140 processes real-value data types. Real-value data types may include types of data for which the data values may be any numerical value, such as "1.5", "25.6", or "89". Upon determining that the data type of the data included in the set of annotated time-series data includes real-value data types, the anomaly detection sub-system 135 identifies the appropriate detector 140 that is configured to process real-value time-series data. The detector 140 configured to process real-value data types may apply specific processing to the real-value time-series data. For example, when processing latency histogram values, where the value may represent a real-value data type that is associated with the latency between two network entities (e.g., measured in milliseconds), the detector 140 that has been identified to process real-value time-series data types may first convert the latency histogram data into a cumulative distribution function (CDF) curves representing the real-value latency data. The CDF curves may then be normalized and the detector 140 may then determine the differences in the area under the curve. Upon detecting anomalous data values in the real-value time-series data that are outside the area under the curve, the identified detector 140 may annotate those real-value time-stamped data values as anomalous.

At stage 550, one of the detectors 140 processes categorical data types. Categorical data types may include types of data for which the data values may be one of multiple selections, such as a categorical data type that identifies network entity ownership. There may be more than two possible network owners associated with a particular network entity. The ownership of the network entity may change over time. Upon determining that the data type of the data includes in the set of annotated time-series data includes categorical data types, the anomaly detection sub-system 135 identifies the appropriate detector 140 that is configured to process categorical time-series data. The identified detector 140 may apply specific processing to the categorical time-series data. For example, a change in the categorical data value or a value spike at a specific timestamp may indicate an anomalous data point. In some implementations, thresholds can be learned from historical data and used to identify anomalies for future evaluations of data represented as categorical time-series data types. Upon detecting anomalous data values in the categorical time-series data, the identified detector 140 may annotate those categorical time-stamped data values as anomalous.

At stage 560, the detectors 140 annotate anomalous time-stamped data points. As described above in relation to the data-type-specific processing that is performed by the detectors 140, anomalous time-stamped data points may be annotated to identify the data points as an anomaly. The annotation may be a unique identifier that is applied to anomalous data points. In some implementations, the unique identifier may be based on the data type of the anomalous data point in order to distinguish the resulting groups of anomalous data of one data-type from the anomalous groups identified for a different data-type.

Figure 6:
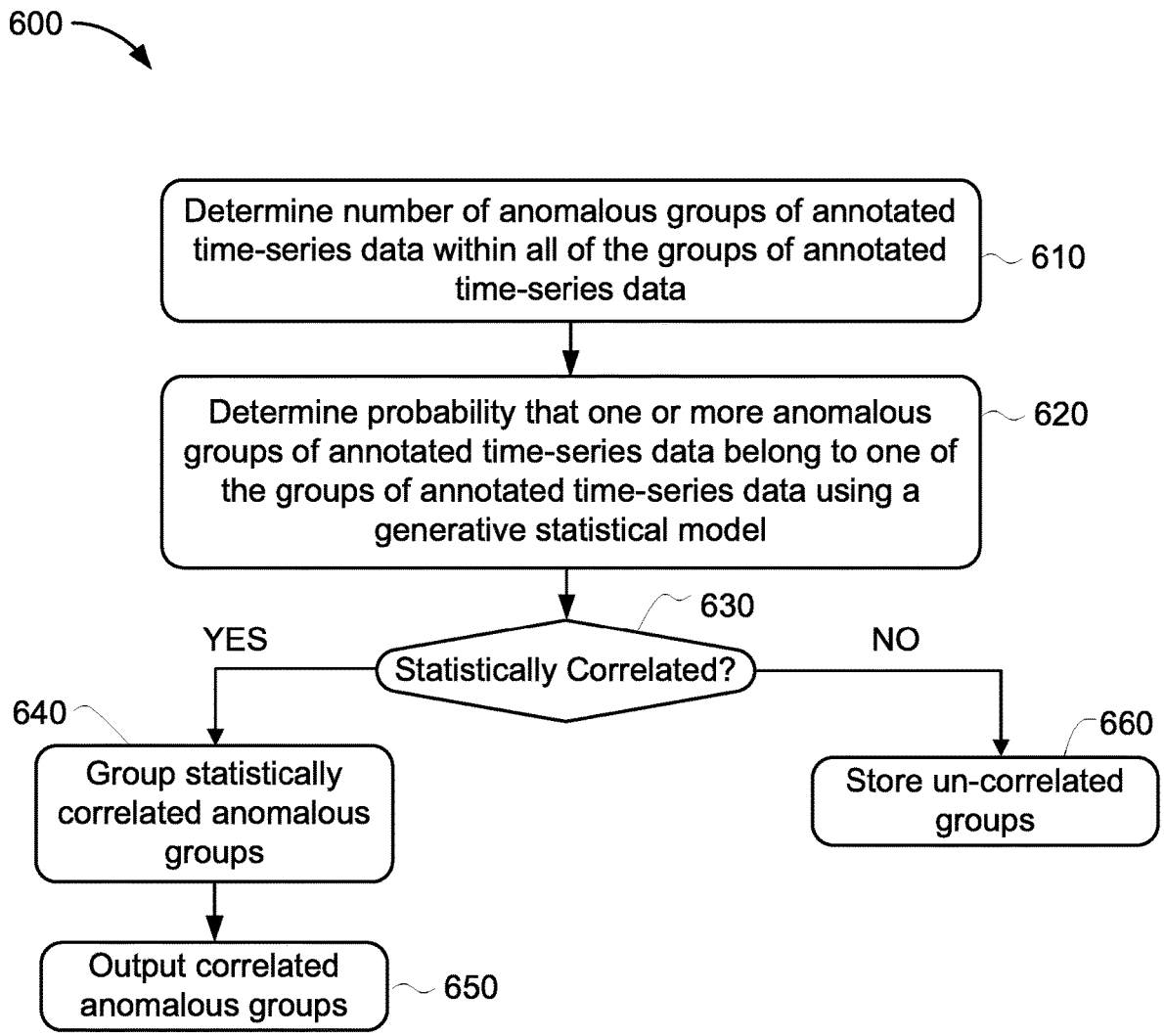
FIG. 6 is a flowchart showing an example method for correlating anomalous groups of time-series data.

FIG. 6 illustrates an example method 600 for correlating anomalous groups of time-series data performed by the global correlator 150 that may be configured within the anomaly correlation sub-system 145 shown in FIG. 1. The method 600 describes the method steps associated with outputting correlated anomalous groups which was described earlier in relation to stage 340 of FIG. 3. The method 600 includes determining the number of anomalous groups of annotated time-series data within all of the groups of annotated time-series data (stage 610). The method includes determining the probability that each anomalous group of annotated time-series data belongs to one of the groups of annotated time-series data using a generative statistical model (stage 620). The method also includes determining whether or not the annotated time-series groups are statistically correlated (stage 630). The method includes, responsive to determining that the annotated time-series groups are statistically correlated, grouping the statistically correlated anomalous groups (stage 640) and outputting the correlated anomalous groups (stage 650). The method also includes, responsive to determining that the annotated time-series groups are not statistically correlated, storing the un-correlated groups (stage 660).

At stage 610, the global correlator 150 receives the one or more groups of annotated time-series data generated by the local detectors 140 and determines the number of anomalous groups of annotated time-series data within all of the groups of annotated time-series data. In this way, the likelihood of cross-group correlation and inaccurate anomaly correlation may be reduced or avoided. In addition, by dividing the groups of annotated time-series data into smaller groups, the groups may be processed in parallel, for example in a distributed architecture similar to that shown in FIG. 2, configured with multiple anomaly correlation sub-systems

215. The global correlator 150 may be configured to utilize a locality sensitive hashing algorithm to detect the number of anomalous groups or potentially anomalous groups across all of the annotated time-series groups received from the detectors 140. Locality sensitive hashing (LSH) serves to reduce the dimensionality of high-dimensional data, such as time-series data. LSH hashes the inputted annotated groups of time-series data so that similarly annotated time-stamps in each group may be mapped or grouped as an anomalous group of annotated time-series data.

At stage 620, the global correlator 150 determines the probability that each anomalous group of annotated time-series data belongs to one of the groups of annotated time-series data using a generative statistical model. The groups of anomalous annotated time-series data which include real-values data types may be transformed into binary or categorical data types by calculating the mean and standard deviations for each group of time-series data. The new value will be how many standard deviations the old value is from the mean. With the number of groups of anomalous annotated time-series data now known, the number of groups may be used as an input parameter to the generative statistical model in order to determine the probability that each anomalous group of annotated time-series data belongs to one of the groups of annotated time series data.

Generative statistical models are models used for generating values that may be associated with a phenomenon, such as anomalous time-series data that is associated with a network failure event. The generative statistical models generate values associated with phenomenon that may be observed as well as phenomenon that may be hidden. Generative statistical models are typically probabilistic and specify a joint probability distribution over the observed and hidden phenomenon values. Examples of generative statistical models include Gaussian mixture models, hidden Markov models, naïve Bayes models and latent Dirichlet allocation models. Latent dirichlet allocation (LDA) modeling is a natural language processing technique that can infer latent topics, or groupings of words, that may be likely to occur in a set of documents. LDA may also be used for anomaly correlation by considering the discrete time-stamps data points of individual time-series data as "documents" and the network entities that failed within each particular discrete time-stamp data point as the corresponding document "words". By determining and inputting the number of anomalous annotated groups of time-series data as the number of observed "topics", the LDA model may output a distribution of probabilities of failing network entities per topic, where the entities associated with higher probabilities may be most likely to fail simultaneously over the time period captured by the collection of individual time-series data that was input to the model. In this way, groups of correlated failing network entities may be determined based on temporal failure patterns without performing exhaustive pairwise comparisons of individual time-series data. This is possible because the LDA model assumes that the "documents" or discrete time-stamps data points of individual time-series data will be sparse and include relatively few failures (or detected anomalies) compared to the time-series data that is associated with the total number of network entities.

In addition, LDA models may be trained to explain network failure events that may be associated with independent latent factors. Each factor may consist of a set of links connecting one or more network entities that tend to historically fail together. In this mixed-membership model, a link failure can be attributed to different factors at different time-stamps. The LDA model may learn sets of independent and sparse factors, for example each factor may be mapped to a small number of failure patters that occur simultaneously. The LDA model may also allow use of domain knowledge. For example, the physical single points of network failures may be modeled explicitly in the LDA training process. In this example, the link-to-factor assignment may be fixed and only the failure probability may be learned from the model. The LDA model training process may be implemented using a feedback loop between the anomaly correlation sub-system 145 and the anomaly detection sub-system 135, as shown in FIG. 1 as a bi-directional arrow between the two sub-systems.

At stage 630, the method includes determining whether or not the groups of anomalous time-series data are statistically correlated. The global detector 150 may compare the probabilities generated by the LDA model and statistically correlate one or more anomalous groups based on the determination that one or more groups include one or more statistically correlated anomalous time-stamped data points. In some implementations the statistical correlation may be based on one or more probabilities exceeding a pre-determined threshold. For example, the global correlator 150 may determine that one or more groups of anomalous time-series data may be statistically correlated based on the output distribution of probabilities for one or more groups exceeding a particular threshold value.

At stage 640, responsive to determining that one or more groups of anomalous time-series data are statistically correlated, the global correlator 150 may group the statistically correlated anomalous groups. For example, the global correlator 150 may group correlated anomalous groups of time-series data based on two or more of the correlated anomalous groups based on the two or more groups including the one or more shared network entities that have failed. In some implementations, the global correlator 150 may group correlated anomalous groups based on the two or more correlated groups including similar failure probabilities as determined by the LDA model in stage 620. In some implementations, the global correlator 150 may group correlated anomalous groups based on the two or more correlated groups including failure probabilities that are within a range of pre-determined values.

At stage 650, the global correlator 150 outputs correlated anomalous groups. The global correlator 150 may output the correlated anomalous groups to the plurality of local correlators 155 as shown in FIG. 1 or 2.

At stage 660, responsive to determining that one or more groups of anomalous time-series data are not statistically correlated, the global correlator 150 may store the statistically un-correlated groups. Groups are considered statistically un-correlated if the global correlator 150 has determined the groups do not include correlated anomalous time-stamp data, or the correlation between the data in the groups is below a pre-selected correlation threshold. In such situations, the global correlator 150 may, for example, store the statistically un-correlated groups in memory or a database. In some implementations, the global correlator 150 may store the statistically un-correlated groups for use in training the LDA model.

Figure 7:
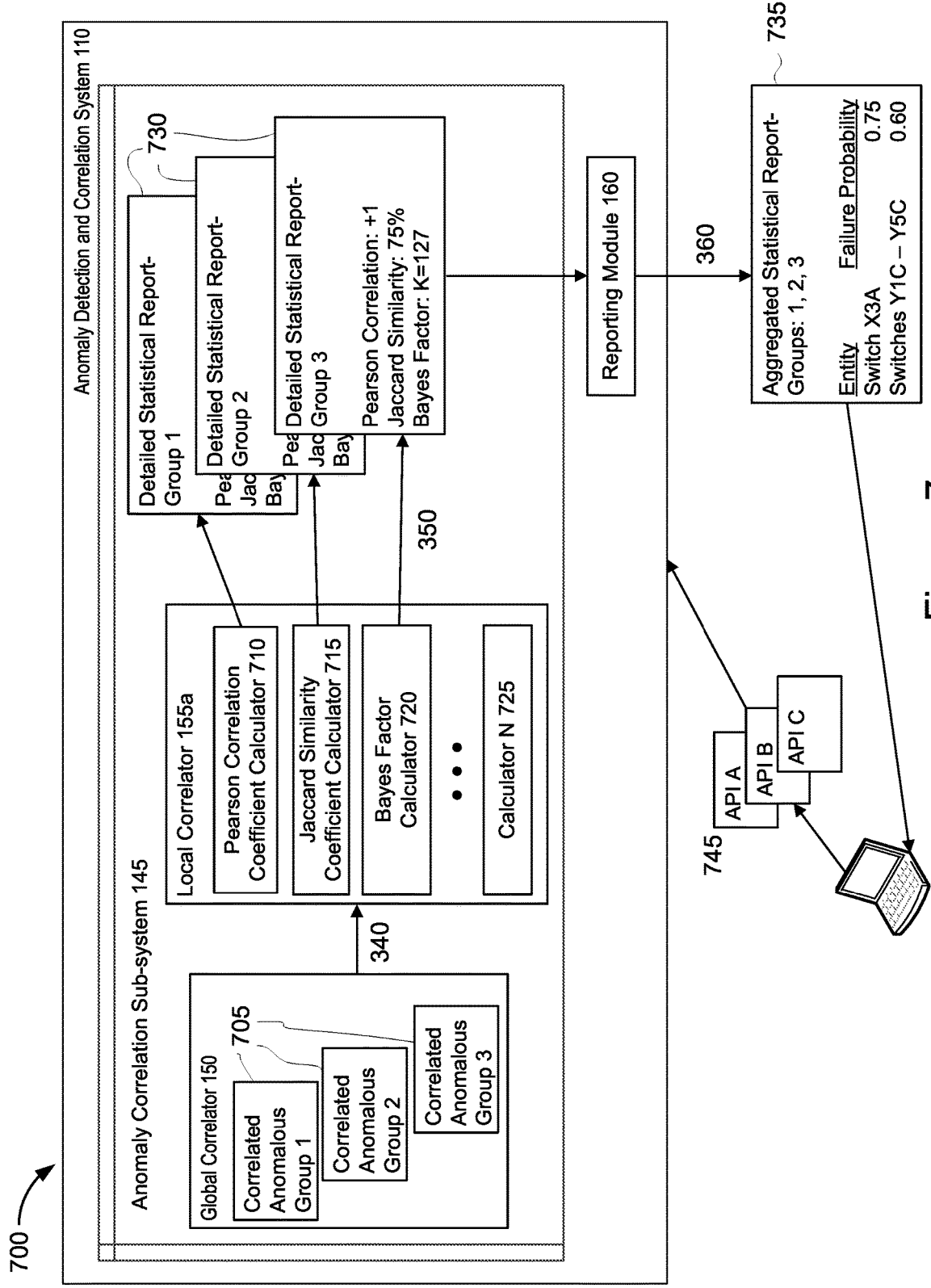
FIG. 7 illustrates an example functional block diagram for generating detailed statistical reports for each correlated anomalous group and for outputting an aggregated statistical report.

FIG. 7 is an example functional block diagram for generating detailed statistical reports for each correlated anomalous group and outputting an aggregated statistical report. The diagram 700 includes similar components as described in relation to FIG. 1, however for clarity, the data collector 130 and the anomaly detection subsystem 135 have been removed from the anomaly detection and correlation system 110 in order to describe the processing performed by the local correlators 155 and the reporting module 160 in more detail.

As shown in FIG. 7, the anomaly correlation sub-system 145 includes a global correlator 150 and a plurality of correlated anomalous groups 705, e.g., correlated anomalous groups 1-3. The anomaly correlation sub-system 145 also includes a local correlator 155a. The local correlator 155a includes a plurality of calculators such as the Pearson correlation coefficient calculator 710, the Jaccard similarity coefficient calculator 715, and the Bayes factor calculator 720. The local correlators 155, such as local correlator 155a, may also be configured to include a variety of other calculators as shown by calculator N 725. The anomaly detection and correlation system 110 includes a plurality of detailed statistical reports 730 and a reporting module 160. The architecture 700 includes an aggregated statistical report 735, a computing device 740 and a plurality of APIs 745.

As shown in FIG. 7, the anomaly correlation sub-system 145 includes a global correlator 150. The global correlator 150 may determine the number of anomalous groups and outputs one or more correlated anomalous groups 705. The global correlator outputs the correlated anomalous groups as described in relation to method step 340 shown in FIG. 3. The global correlator 150 outputs the correlated anomalous groups 705 to the local correlator 155a.

As further shown in FIG. 7, the anomaly correlation sub-system 145 includes a local correlator 155, such as local correlator 155a. The local correlator 155a includes a plurality of calculators that may be configured to generate specific statistical data for each group of correlated anomalous time-series data received from the global correlator 150. The local correlator 155a includes a Pearson correlation coefficient calculator 710, a Jaccard similarity coefficient calculator 715, and a Bayes factor calculator 720. The local correlators 155, such as the local correlator 155a, may also include any number of calculators, shown as calculator N 725, that are appropriate for providing statistics related to a received group of correlated anomalous time-series data 705.

The Pearson correlation coefficient (PCC) calculator 710 may be used to generate a measure of the linear correlation between two variables. The Pearson correlation coefficient calculator 710 may generate a value that is between +1 and −1, where +1 is indicative of a total positive linear correlation, 0 is indicative of no linear correlation, and −1 is indicative of a total negative linear correlation. The local correlator 155a may apply the Pearson correlation coefficient calculator 710 to one or more correlated anomalous groups 705 and determine the Pearson correlation coefficient between the correlated anomalous time-stamped data points within each correlated anomalous groups 705.

As further shown in FIG. 7, the local correlator 155a includes a Jaccard similarity coefficient calculator 715. The Jaccard similarity coefficient calculator 715 may generate a statistic used for comparing the similarity and diversity of input sample sets. The Jaccard similarity coefficient measures similarities between finite sample sets and is defined as the size of the intersection divided by the size of the union of the sample sets. The Jaccard similarity coefficient may be represented as a percentage identifying the degree of similarity between two sets of data. For example, a Jaccard similarity coefficient of 100% indicates that two sets of data share all of the same members, while a Jaccard similarity coefficient of 0% indicates that the two sets share no members. A Jaccard similarity coefficient of 50% indicates that the two sets share half of the members. In some implementations, the local correlator 155a may apply the Jaccard correlation coefficient calculator 715 to the correlated anomalous groups 705 received from the global correlator 150 and determine the Jaccard correlation coefficients between the correlated anomalous time-stamped data points within each correlated anomalous groups 705.

As shown in FIG. 7, the local correlator 155a includes a Bayes factor calculator 720. The Bayes factor calculator 720 may generate a Bayes factor that represents a ratio of the likelihood probability of two competing hypotheses, usually a null hypothesis and an alternative hypothesis. The Bayes factor is a way of quantifying support for one particular hypothesis model over another in order to determine which particular hypothesis model is true. Various scales have been proposed in literature to assist interpreting the calculated Bayes factor values. For example, Bayes factors that range from 1-3 indicate the strength of one particular hypothesis over a second hypothesis is barely worth mentioning, Bayes factors that range between 3-20 indicate positive evidence that one particular hypothesis is stronger than a second hypothesis, while Bayes factors that range between 20-150 indicate strong evidence that one particular hypothesis is stronger than a second hypothesis. In some implementations, the local correlator 155a may apply the Bayes factor calculator 720 to the correlated anomalous groups 705 to determine that the correlated anomalous time-stamped data points within each group are anomalous when compared to other correlated anomalous time-stamped data points within the same group.

As further shown in FIG. 7, the local correlators 155, such as local correlator 155a, output one or more detailed statistical reports 730 as described in relation to method step 350 shown in FIG. 3. The detailed statistical reports 730 generated by the local correlator 155a are subsequently processed by the reporting module 160. The reporting module 160 may collect or receive the detailed statistical reports 730 generated for each correlated anomalous group 705 and output an aggregated statistical report 735 for one or more of the correlated anomalous groups. The reporting module 160 may output the aggregated statistical report 735 as described in relation to method step 360 shown in FIG. 3.

As shown in FIG. 7, the aggregated statistical report 735 may include summarized statistical data for one or more correlated anomalous groups 705. The aggregated statistical report 735 may be formatted in a manner that is easily interpreted by humans. The aggregated statistical report 735 may include the probability a single network entity may fail, as well as the probabilities a group of network entities may fail. For example, as shown in FIG. 7, the aggregated statistical report 735 indicates that switch X3A has a 0.75 (or 75%) probability of failing based on the detected anomalies which were correlated in regard to link connectivity data associated with that particular switch. Similarly, the group of individual switches Y1C, Y2C, Y3C, Y4C, and Y5C (shown as Y1C-Y5C) have been identified to have a 0.60 (or 60%) probability of failing based on the detection anomalies which were correlated in regard link connectivity data associated with this group of individual switches.

As further shown in FIG. 7, a computing device, such as computing device 740 may interact with the anomaly detection and correlation system 110 via one or more APIs 745 (e.g., APIs A-C). For example, a user of computing device 740 may submit commands via one or more APIs 745 to the anomaly detection and correlation system 110. The API 745 may specify computer-readable executable instructions for the reporting module 160 that may be configured in the anomaly detection and correlation system 110 to output the aggregated statistical report 735 to the computing device 740.

Figure 8:
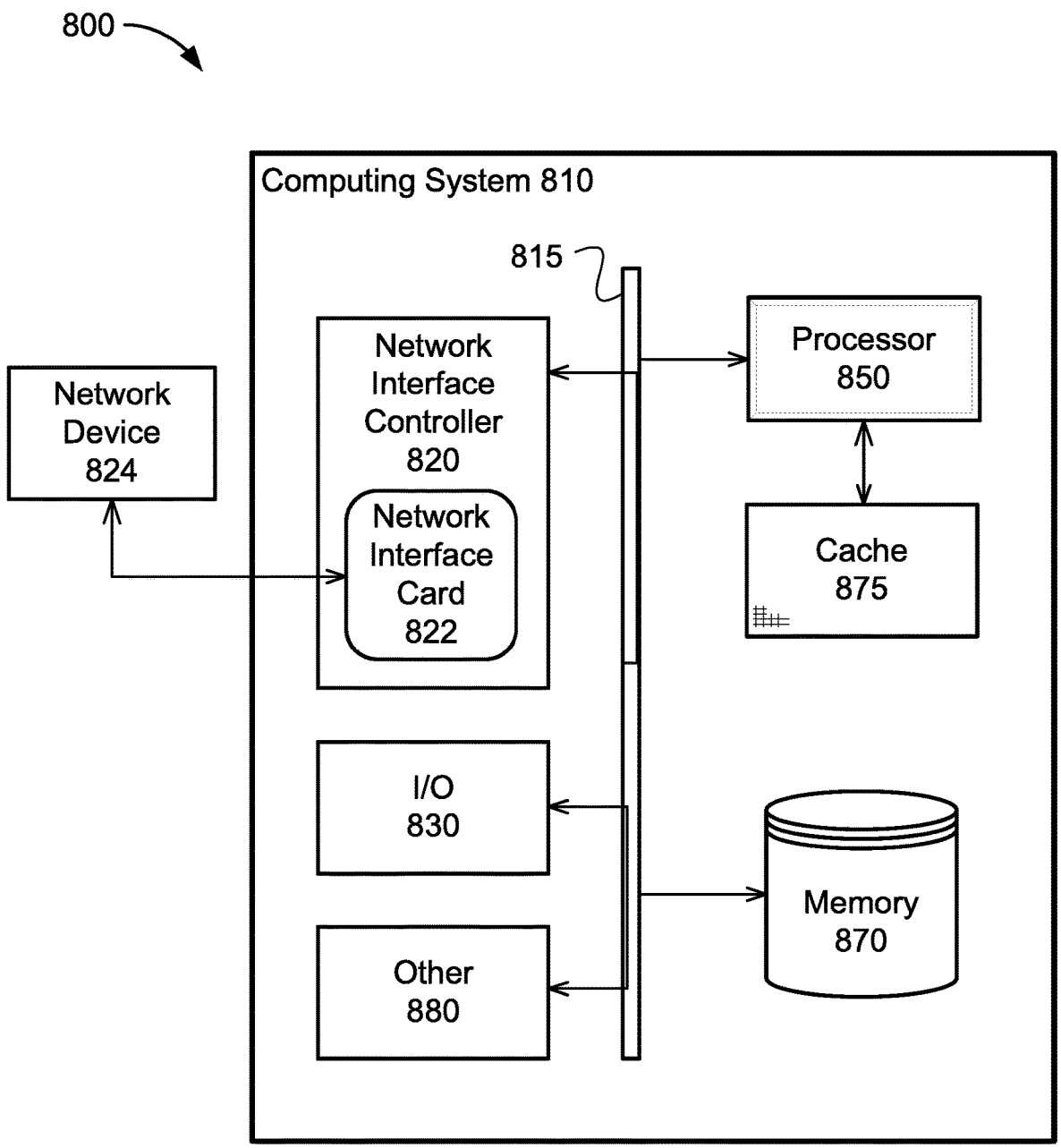
FIG. 8 is a block diagram of an example computing system.

FIG. 8 is a block diagram 800 illustrating an example computer system 810 with which the time-series data sources 105, the anomaly detection and correlation system 110 including any components therein of FIG. 1, and the computing device 740 of FIG. 7 can be implemented. In certain aspects, the computer system 810 may be implemented using hardware or a combination of software and hardware, either in a dedicated server, or integrated into another entity, or distributed across multiple entities.

In broad overview, the computing system 810 includes at least one processor 850 for performing actions in accordance with instructions and one or more memory devices 870 or 875 for storing instructions and data. The illustrated example computing system 810 includes one or more processors 850 in communication, via a bus 815, with at least one network interface driver controller 820 with one or more network interface cards 822 connecting to one or more network devices 824, memory 870, and any other devices 880, e.g., an I/O interface. The network interface card 822 may have one or more network interface driver ports to communicate with the connected devices or components. Generally, a processor 850 executes instructions received from memory. The processor 850 illustrated incorporates, or is directly connected to, cache memory 875.

In more detail, the processor 850 may be any logic circuitry that processes instructions, e.g., instructions fetched from the memory 870 or cache 875. In many embodiments, the processor 850 is a microprocessor unit or special purpose processor. The computing device 810 may be based on any processor, or set of processors, capable of operating as described herein. The processor 850 may be a single core or multi-core processor. The processor 850 may be multiple processors. In some implementations, the processor 850 can be configured to run multi-threaded operations. In some implementations, the processor 850 may host one or more virtual machines or containers, along with a hypervisor or container manager for managing the operation of the virtual machines or containers. In such implementations, the methods shown and described in FIGS. 3-7 can be implemented within the virtualized or containerized environments provided on the processor 850.

The memory 870 may be any device suitable for storing computer readable data. The memory 870 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 810 may have any number of memory devices 870. In some implementations, the memory 870 supports virtualized or containerized memory accessible by virtual machine or container execution environments provided by the computing system 810.

The cache memory 875 is generally a form of computer memory placed in close proximity to the processor 850 for fast read times. In some implementations, the cache memory 875 is part of, or on the same chip as, the processor 850. In some implementations, there are multiple levels of cache 875, e.g., L2 and L3 cache layers.

The network interface driver controller 820 manages data exchanges via the network interface driver 822 (also referred to as network interface driver ports). The network interface driver controller 820 handles the physical and data link layers of the OSI model for network communication. In some implementations, some of the network interface driver controller's tasks are handled by the processor 850. In some implementations, the network interface driver controller 820 is part of the processor 850. In some implementations, a computing system 810 has multiple network interface driver controllers 820. The network interface driver ports configured in the network interface card 822 are connection points for physical network links. In some implementations, the network interface controller 820 supports wireless network connections and an interface port associated with the network interface card 822 is a wireless receiver/transmitter. Generally, a computing device 810 exchanges data with other network devices 824 via physical or wireless links that interface with network interface driver ports configured in the network interface card 822. In some implementations, the network interface controller 820 implements a network protocol such as Ethernet.

The other network devices 824 are connected to the computing device 810 via a network interface driver port included in the network interface card 822. The other network devices 824 may be peer computing devices, network devices, or any other computing device with network functionality. For example, a first network device 824 may be a network device such as a hub, a bridge, a switch, or a router, connecting the computing device 810 to a data network such as the Internet or network 210 shown in FIG. 2.

The other devices 880 may include an I/O interface, external serial device ports, and any additional co-processors. For example, a computing system 810 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 800 includes an additional device 880 such as a coprocessor, e.g., a math co-processor can assist the processor 850 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method for detecting and correlating anomalous time-series data, the method comprising:
    receiving a plurality of time-series data associated with one or more network data streams;
    processing the received plurality of time-series data;
    generating, based on the processed time-series data, one or more sets of aligned time-series data;
    detecting anomalous time-stamped data points in each of the one or more sets of aligned time-series data;
    annotating each of the anomalous time-stamped data points;
    generating, based on the annotated time-stamped data points, one or more groups of annotated time-series data;
    determining, based on the annotated time-series data, a number of anomalous groups of annotated time-series data within all of the one or more groups of annotated time-series data;
    determining, using a generative statistical model, a probability that one or more of the number of the anomalous groups of annotated time-series data belong to at least one of the one or more groups of annotated time-series data;
    determining, based on one or more of the anomalous groups including one or more statistically correlated anomalous time-stamped data points and a comparison of the determined probabilities, one or more correlated anomalous groups within the number of anomalous groups;
    generating a detailed statistical report for each correlated anomalous group; and
    aggregating the detailed statistical reports for each correlated anomalous group and outputting the aggregated statistical report.

2. The method of claim 1, wherein the received time-series data includes one or more of binary data types, categorical data types, or real-valued data types.

3. The method of claim 1, wherein the one or more network data streams are received from external sources.

4. The method of claim 1, wherein processing the received plurality of time-series data comprises one or more of:
    normalizing the time-series data,
    inputting missing values,
    performing time-stamp up-sampling,
    performing time-stamp down-sampling, and
    removing noise from the received plurality of time-series data.

5. The method of claim 4, wherein the steps of processing the received plurality of time-series data are performed in parallel.

6. The method of claim 1, wherein the generated one or more sets of aligned time-series data are temporally aligned.

7. The method of claim 1, wherein detecting anomalous time-stamped data points in each of the one or more sets of aligned time-series data is performed using one or more virtual interfaces, wherein the one or more virtual interfaces are determined based on a data type of each of the one or more sets of the aligned time-series data.

8. The method of claim 7, wherein the one or more of virtual interfaces may detect anomalous time-stamped data points in parallel.

9. The method of claim 1, wherein detecting anomalous time-stamped data points includes discretizing each of the one or more sets of aligned time-series data.

10. The method of claim 1, wherein determining the number of anomalous groups within all of the one or more groups of annotated sets of time-series data is performed using a locality sensitive hashing algorithm.

11. The method of claim 1, wherein the generative statistical model is a Latent Dirichlet Allocation model.

12. The method of claim 1, wherein determining the probability that one or more of the number of the anomalous groups of annotated time-series data belong to at least one of the one or more groups of annotated time-series data and determining one or more correlated anomalous groups is performed in parallel.

13. The method of claim 1, wherein the one or more of a number of the anomalous groups are determined to be not correlated based on the number of anomalous groups not including one or more statistically correlated anomalous time-stamped data points.

14. The method of claim 1, wherein the detailed statistical report for each correlated anomalous group identifies a Pearson correlation coefficient, a Jaccard similarity coefficient, and/or Bayes factors of each of the one or more correlated anomalous group.

15. The method of claim 1, wherein the aggregated statistical report is output to users via one or more application programming interfaces.

16. The method of claim 1, wherein the aggregated statistical report is human-interpretable.

17. The method of claim 1, wherein the aggregated statistical report includes the probabilities of single network entity failures and grouped network entity failures.

18. A system for detecting and correlating anomalous time-series data, the system comprising:
  a memory storing computer-readable instructions and one or more generative statistical models; and
  a processor, the processor configured to execute the computer-readable instructions, which when executed carry out the method comprising:
    receiving a plurality of time-series data associated with one or more network data streams;
    processing the received plurality of time-series data;
    generating, based on the processed time-series data, one or more sets of aligned time-series data;
    detecting anomalous time-stamped data points in each of the one or more sets of aligned time-series data;
    annotating each of the anomalous time-stamped data points; and
    generating, based on the annotated time-stamped data points, one or more groups of annotated time-series data,
    determining, based on the annotated time-series data, a number of anomalous groups of annotated time-series data within all of the one or more groups of annotated time-series data,
    determining, using a generative statistical model, a probability that one or more of the number of the anomalous groups of annotated time-series data belong to at least one of the one or more groups of annotated time-series;
    determining, based on one or more of the anomalous groups including one or more statistically correlated anomalous time-stamped data points and a comparison of the determined probabilities, one or more correlated anomalous groups within the number of anomalous groups,
    generating a detailed statistical report for each correlated anomalous group, and
    aggregating the detailed statistical reports for each correlated anomalous group and outputting the aggregated statistical report.

19. The system of claim 18, wherein the received time-series data includes one or more of binary data types, categorical data types, or real-valued data types.

20. The system of claim 18, wherein the one or more network data streams are received from external sources.

21. The system of claim 18, wherein processing the received plurality of time-series data comprises one or more of:
  normalizing the time series data, inputting missing values,
  performing time-stamp up-sampling,
  performing time-stamp down-sampling, and
  removing noise from the received plurality of time-series data.

22. The system of claim 18, wherein the steps of processing the received plurality of time-series data are performed in parallel.

23. The system of claim 18, wherein the generated one or more sets of aligned time-series data are temporally aligned.

24. The system of claim 18, wherein detecting anomalous time-stamped data points in each of the one or more sets of aligned time-series data is performed using one or more virtual interfaces, wherein the one or more virtual interfaces are determined based on the data type of the aligned time-series data.

25. The system of claim 24, wherein the one or more of virtual interfaces may detect anomalous time-stamped data points in parallel.

26. The system of claim 18, wherein detecting anomalous time-stamped data points includes discretizing each of the one or more sets of aligned time-series data.

27. The system of claim 18, wherein determining the number of anomalous groups within all of the one or more groups of annotated sets of time-series data is performed using a locality sensitive hashing algorithm.

28. The system of claim 18, wherein the generative statistical model is Latent Dirichlet Allocation model.

29. The system of claim 18, wherein determining the probability that each of the number of anomalous groups of annotated time-series data belongs to at least one of the groups of annotated time-series data and outputting one or more correlated anomalous groups is performed in parallel.

30. The system of claim 18, wherein determining the probability that one or more of the number of the anomalous groups of annotated time-series data belong to at least one of the one or more groups of annotated time-series data and determining one or more correlated anomalous groups is performed in parallel.

31. The system of claim 18, wherein the one or more of a number of the anomalous groups are determined to be not correlated based on the number of anomalous groups not including one or more statistically correlated anomalous time-stamped data points.

32. The system of claim 18, wherein the detailed statistical report for each correlated anomalous group identifies a Pearson correlation coefficient, a Jaccard similarity coefficient, and/or Bayes factors of each of the one or more correlated anomalous group.

33. The system of claim 18, wherein the aggregated statistical report is output to users via one or more application programming interfaces.

34. The system of claim 18, wherein the aggregated statistical report is human-interpretable.

35. The system of claim 18, wherein the aggregated statistical report includes the probabilities of single network entity failures and grouped network entity failures.

* * * * *